(12) United States Patent
Mizuno

(10) Patent No.: US 10,644,618 B2
(45) Date of Patent: May 5, 2020

(54) MAGNETIC LEVITATION DEVICE AND METHOD FOR CONTROLLING SAME

(71) Applicant: NATIONAL UNIVERSITY CORPORATION SAITAMA UNIVERSITY, Saitama, Saitama (JP)

(72) Inventor: Takeshi Mizuno, Saitama (JP)

(73) Assignee: NATIONAL UNIVERSITY CORPORATION SAITAMA UNIVERSITY, Saitama (JP)

(*) Notice: Subject to any disclaimer, the term of this patent is extended or adjusted under 35 U.S.C. 154(b) by 600 days.

(21) Appl. No.: 15/311,616

(22) PCT Filed: Feb. 23, 2015

(86) PCT No.: PCT/JP2015/055039
§ 371 (c)(1),
(2) Date: Nov. 16, 2016

(87) PCT Pub. No.: WO2015/178052
PCT Pub. Date: Nov. 26, 2015

(65) Prior Publication Data
US 2017/0093307 A1    Mar. 30, 2017

(30) Foreign Application Priority Data

May 19, 2014  (JP) .................................. 2014-103797

(51) Int. Cl.
*H01H 47/00*   (2006.01)
*H02N 15/00*   (2006.01)

(52) U.S. Cl.
CPC .................. *H02N 15/00* (2013.01)

(58) Field of Classification Search
CPC ..................................................... H02N 15/00
(Continued)

(56) References Cited

U.S. PATENT DOCUMENTS 4,585,282 A * 4/1986 Bosley ................ F16C 32/0451
                                                           104/284

FOREIGN PATENT DOCUMENTS

| EP | 0 239 231 A2 | 9/1987 |
| JP | 61-202406 A | 9/1986 |

(Continued)

OTHER PUBLICATIONS

International Search Report dated May 26, 2015, issued in counterpart International Application No. PCT/JP2015/055039 (2 pages).

*Primary Examiner* — Thienvu V Tran
*Assistant Examiner* — Lucy M Thomas
(74) *Attorney, Agent, or Firm* — Westerman, Hattori, Daniels & Adrian, LLP

(57) ABSTRACT

A magnetic levitation device includes a pair of magnets, a displacement detection means, and a control means. The pair of magnets generate magnetic force for supporting a ferromagnet in a noncontact manner. The displacement detection means detect the displacement of the ferromagnet in a lateral shift direction. The control means suppresses the vibration of the ferromagnet in a lateral shift direction. The control means controls the pair of magnets so that a stronger magnetic force acts on the ferromagnet that is displaced in a direction departing from the center of the vibration than when the ferromagnet is displaced in a direction returning to the center of the vibration.

11 Claims, 19 Drawing Sheets

(58) Field of Classification Search
USPC .......................................................... 361/144
See application file for complete search history.

(56) References Cited

FOREIGN PATENT DOCUMENTS

| | | | |
|---|---|---|---|
| JP | 62-201713 | A | 9/1987 |
| JP | 4-12006 | U | 1/1992 |
| JP | 11-218130 | A | 8/1999 |
| JP | 2001-268981 | A | 9/2001 |
| JP | 2011-190837 | A | 9/2011 |

\* cited by examiner

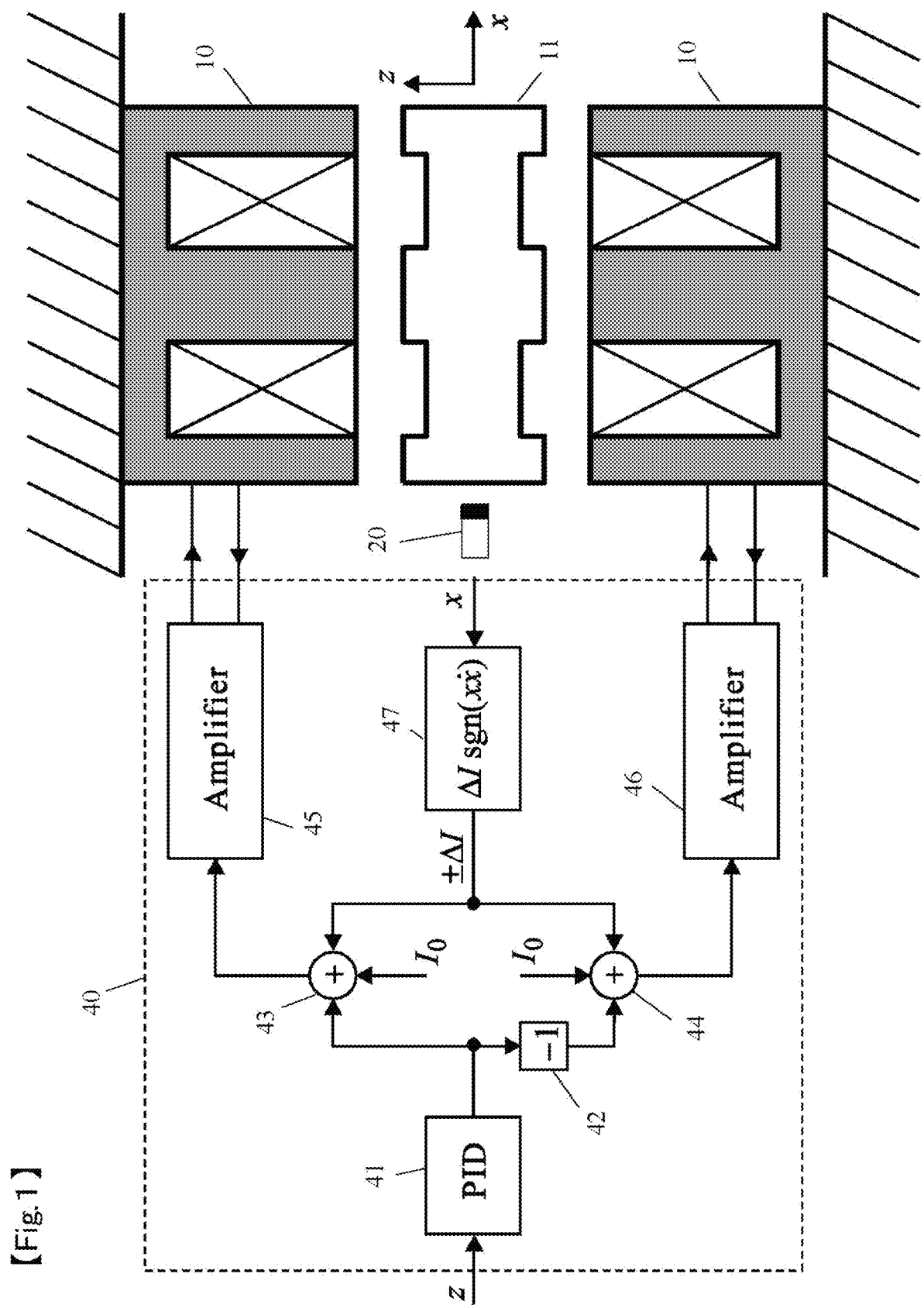
[Fig. 1]

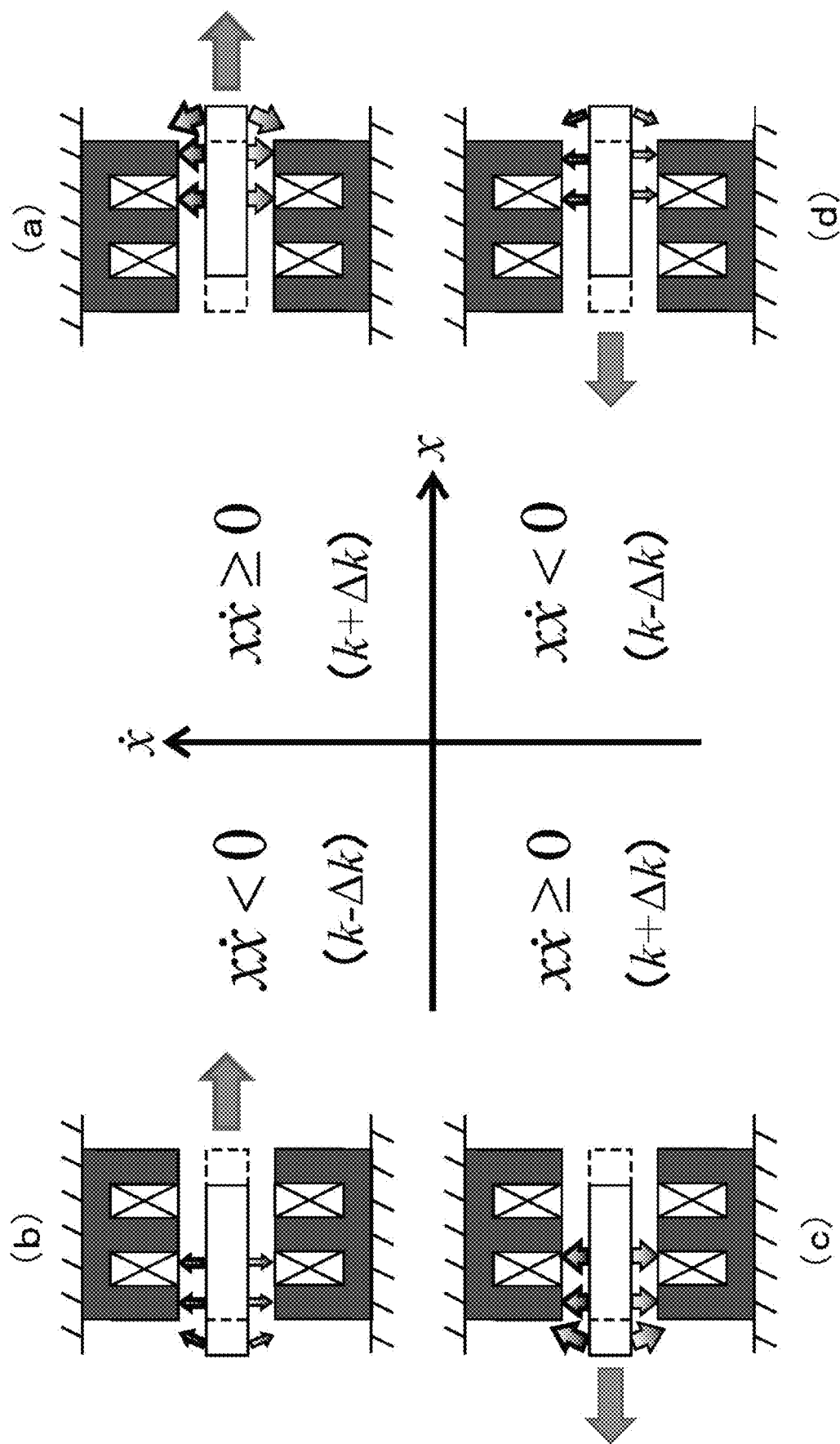
[Fig. 2]

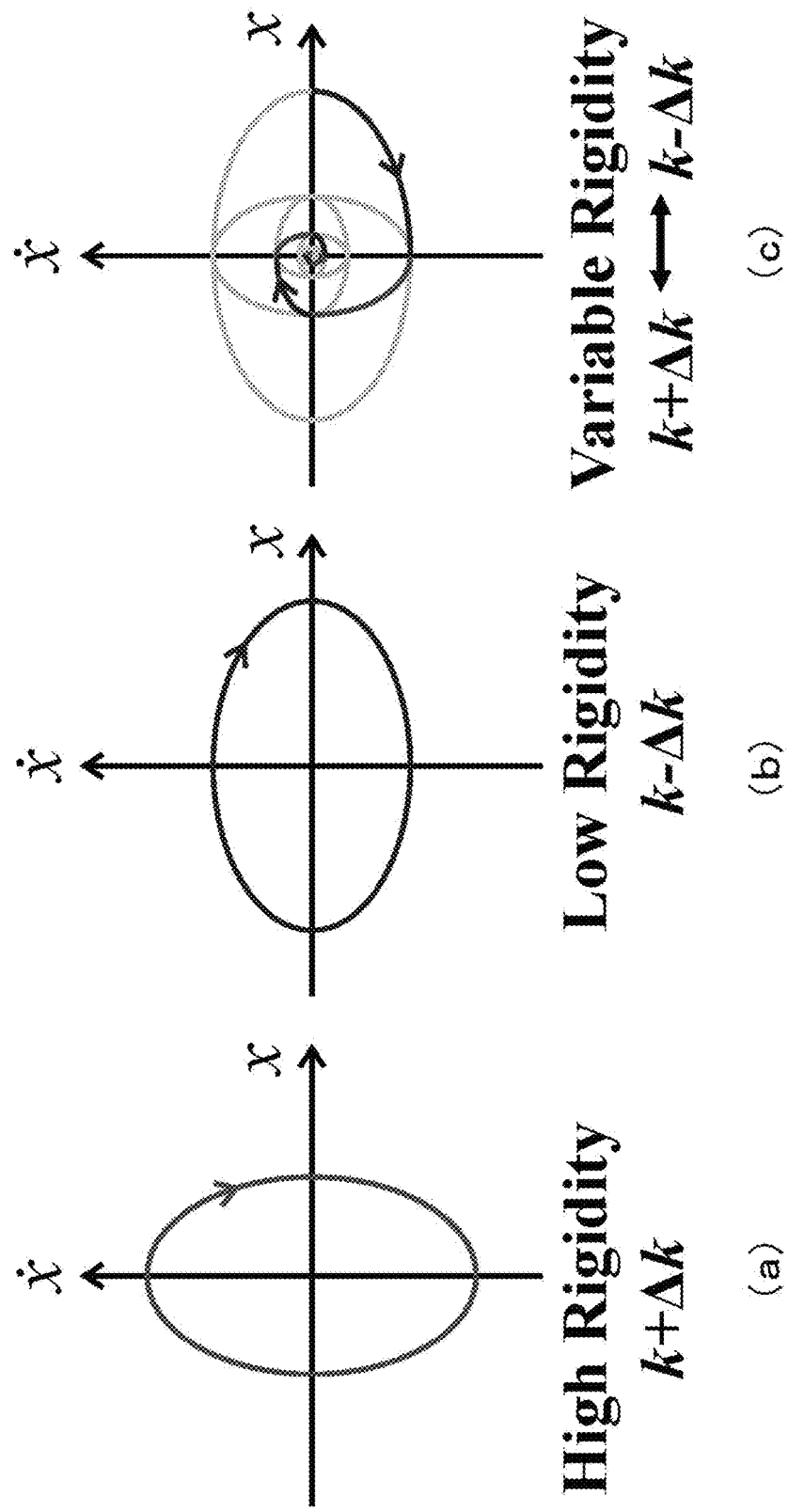

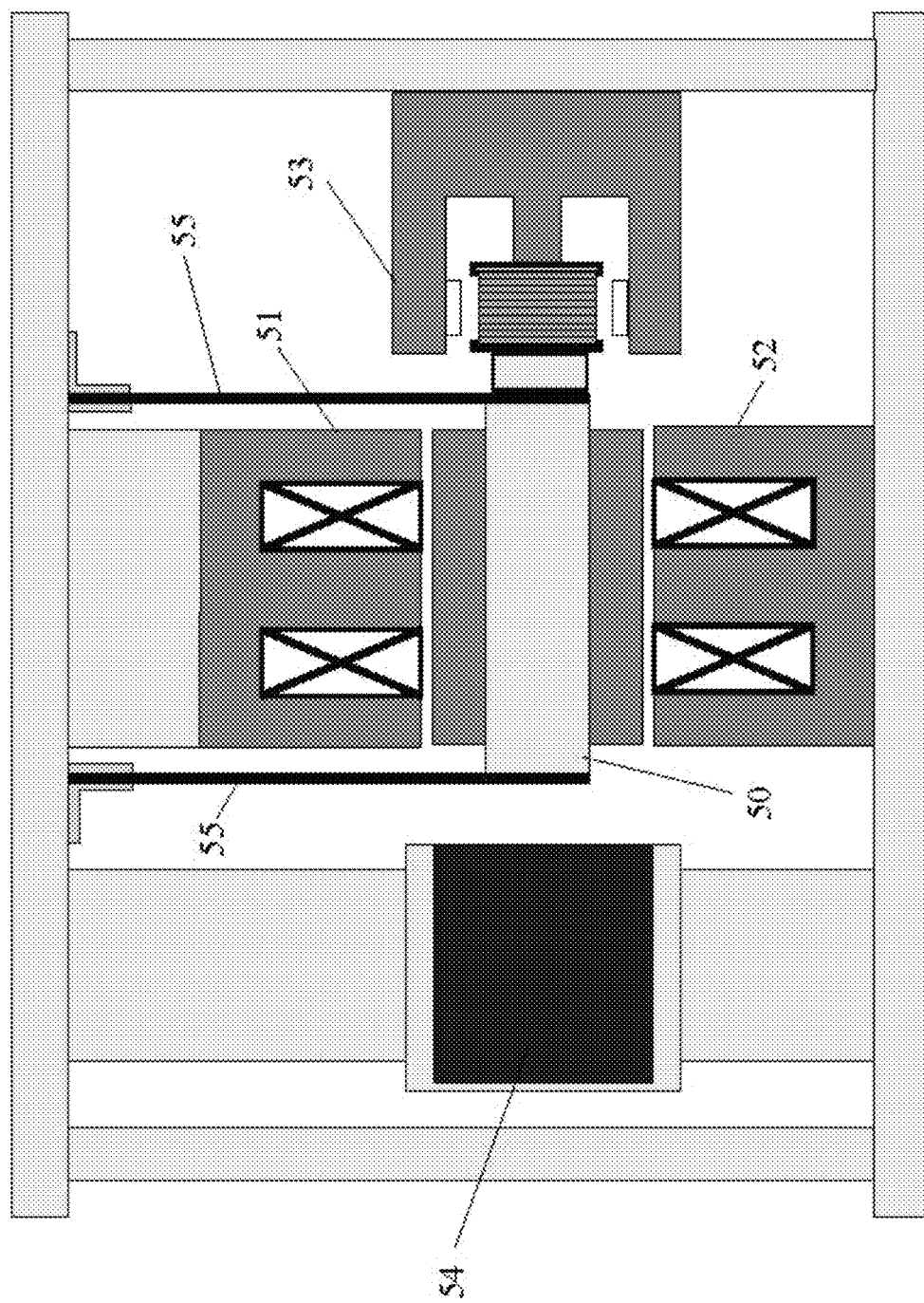
[Fig. 4]

[Fig. 5]
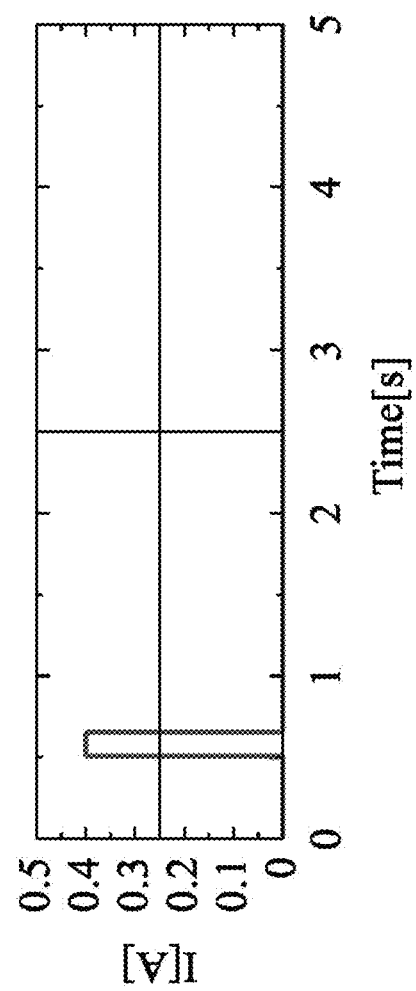

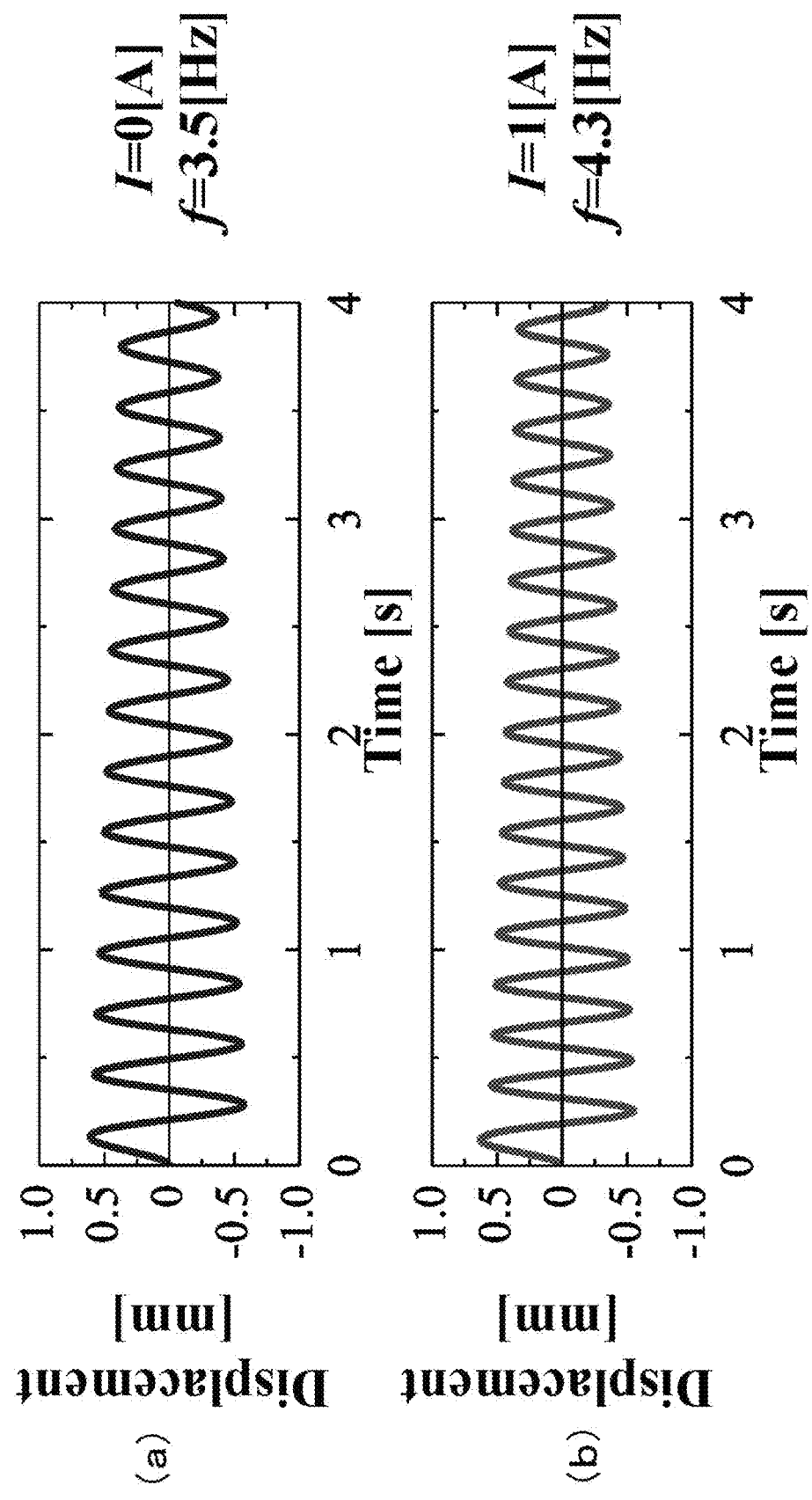
[Fig. 6]

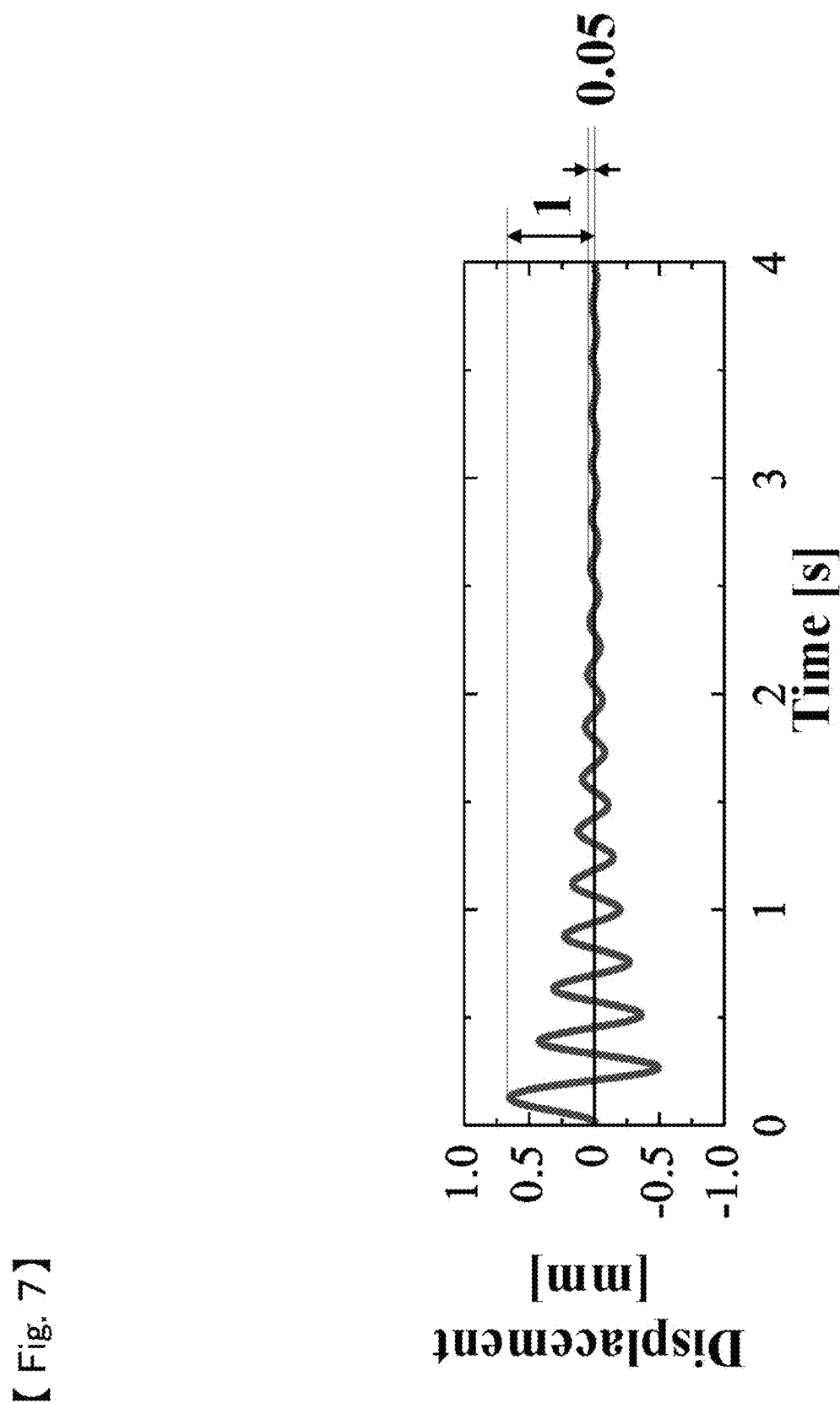
[Fig. 7]

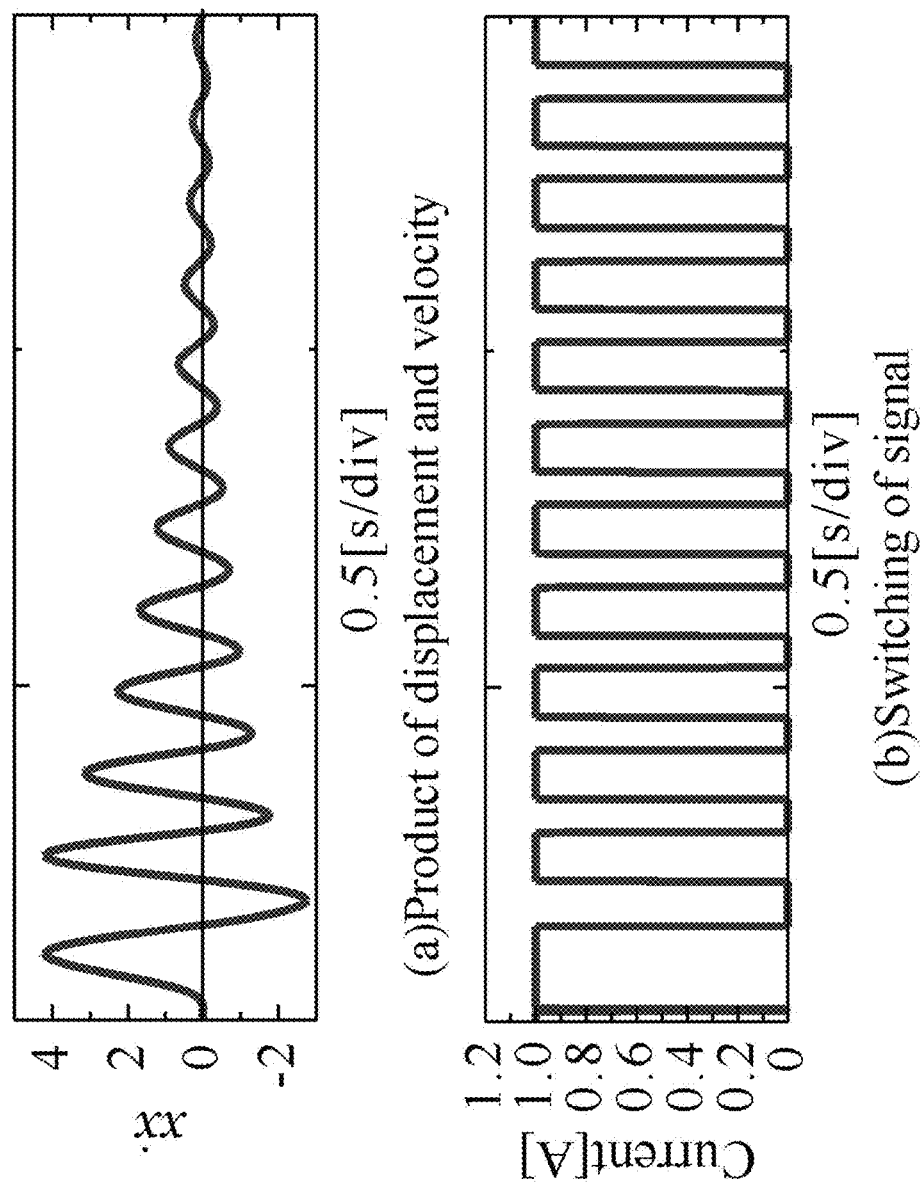
[Fig. 8]

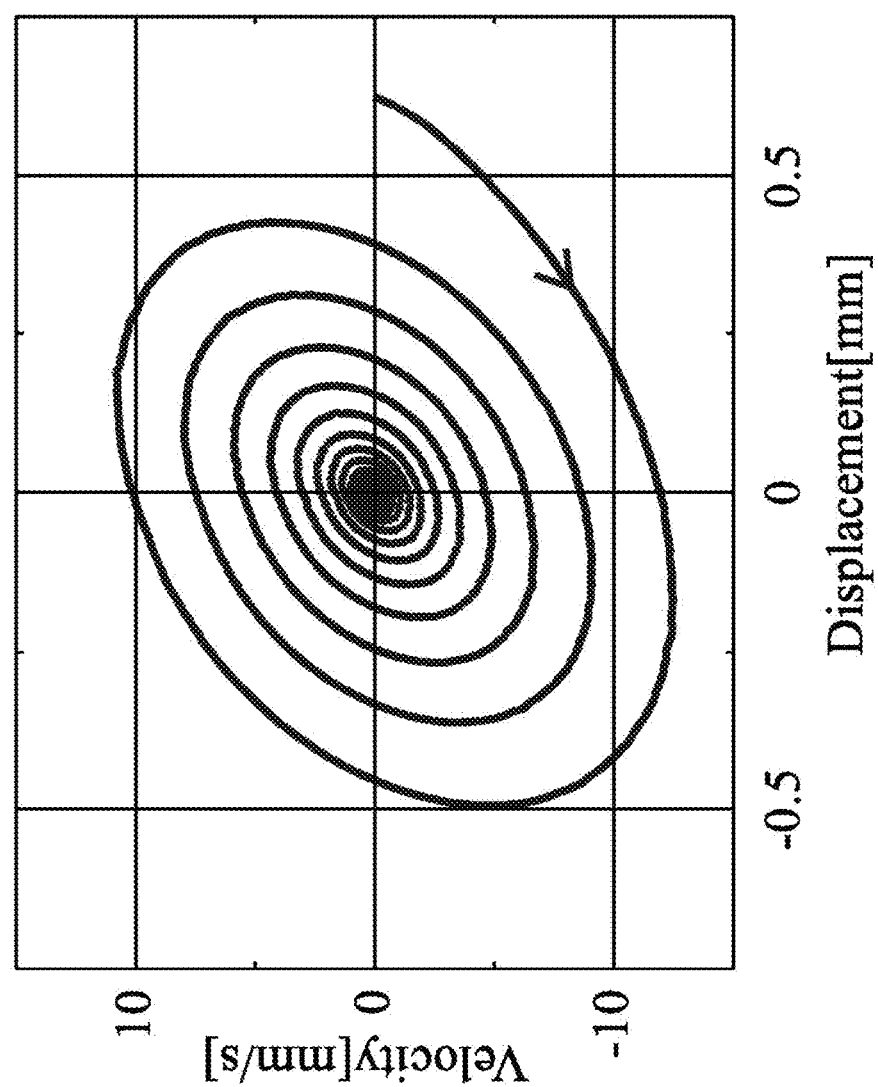
[Fig. 9]

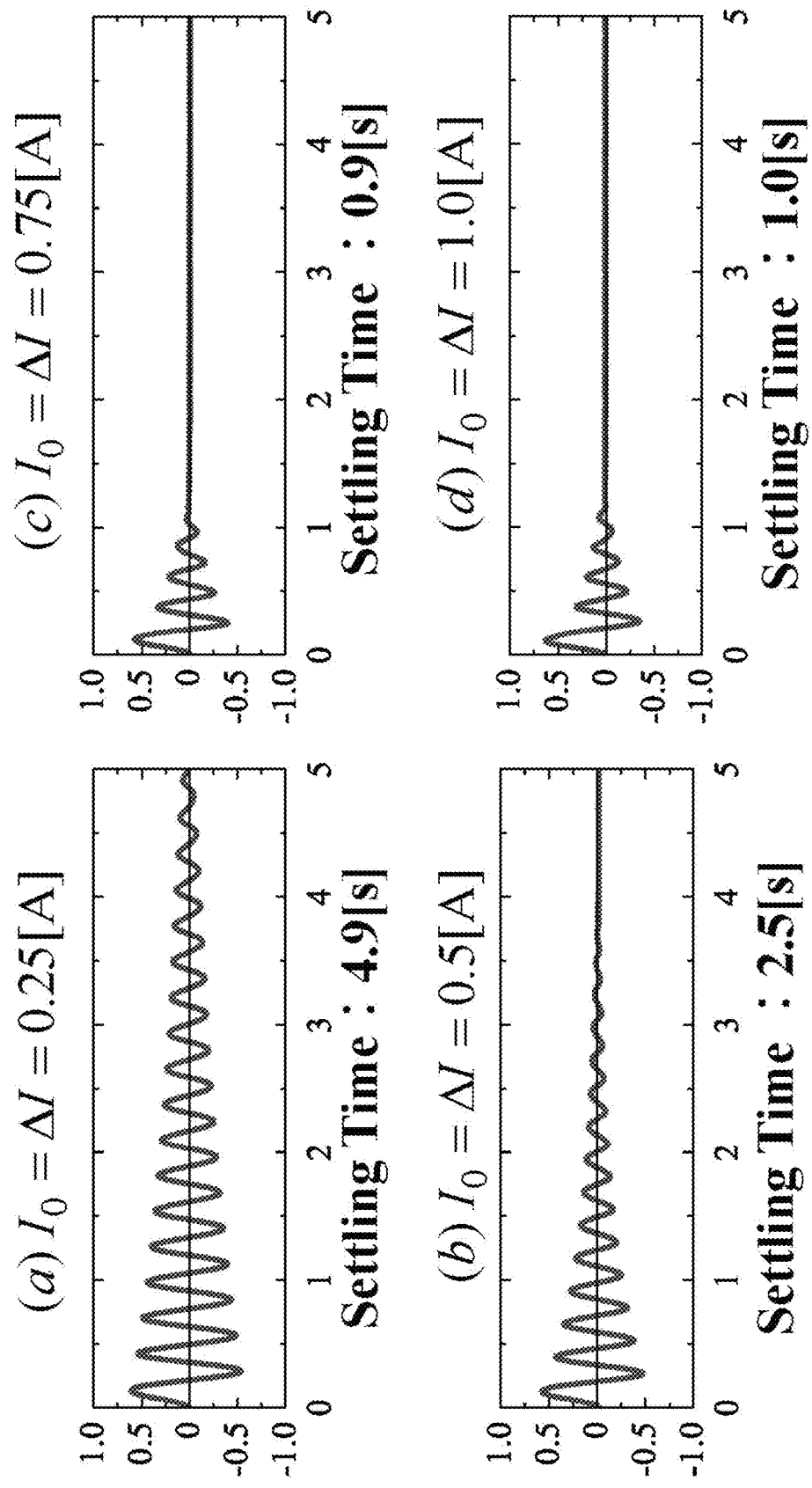
[Fig. 10]

[Fig. 11]
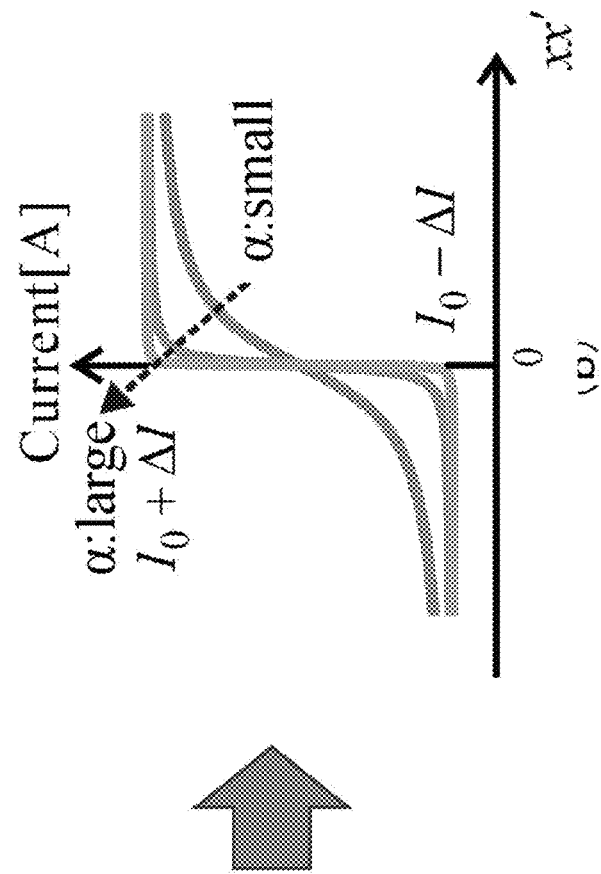
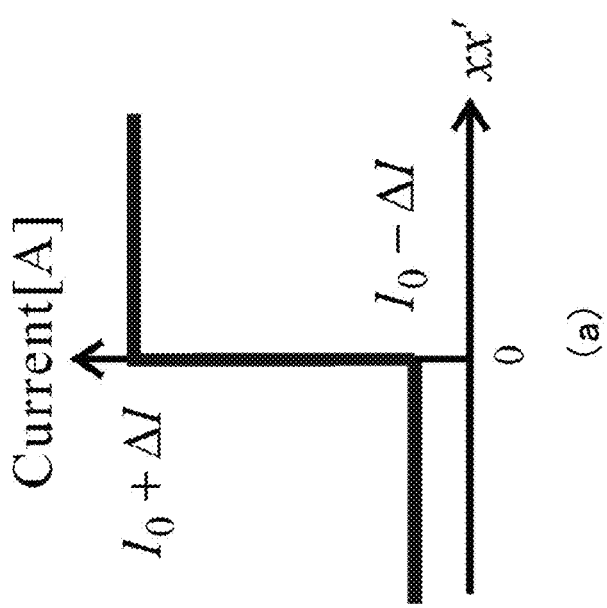

[Fig. 12]
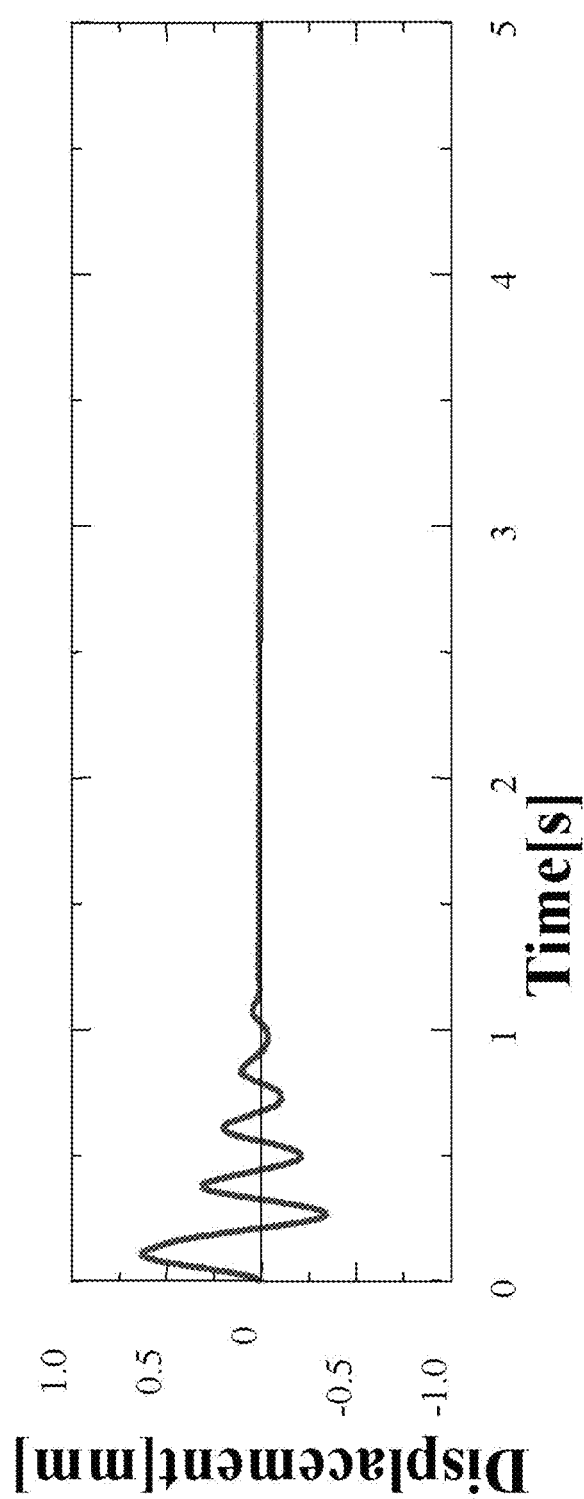

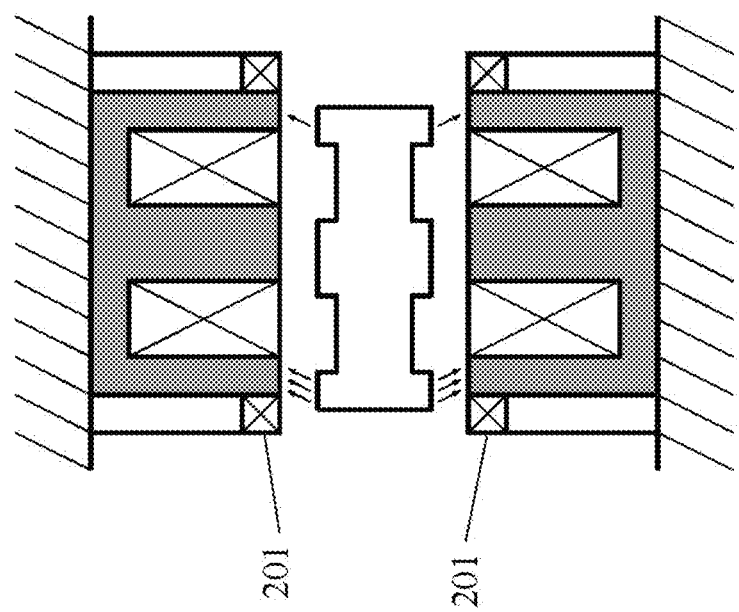
[Fig. 13]

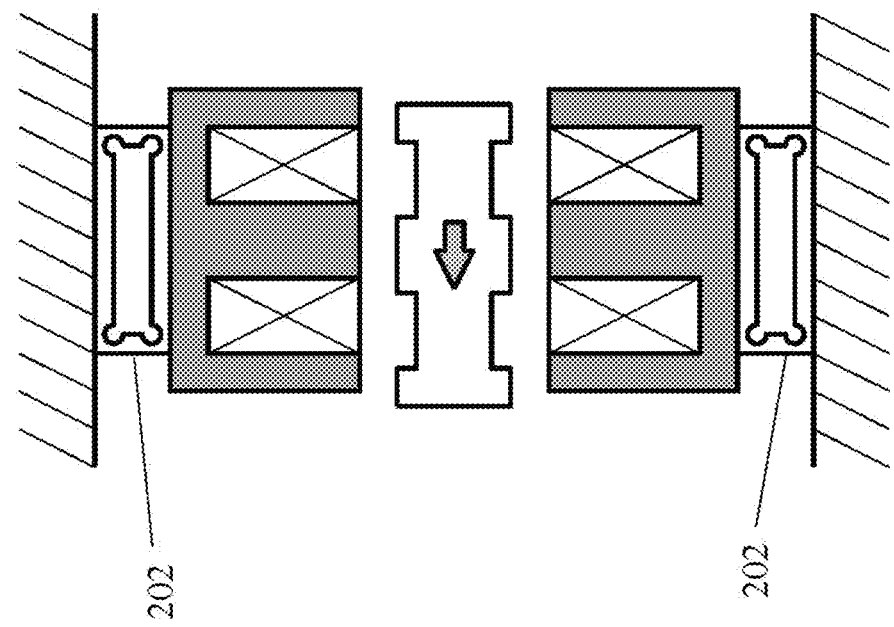
[Fig. 14]

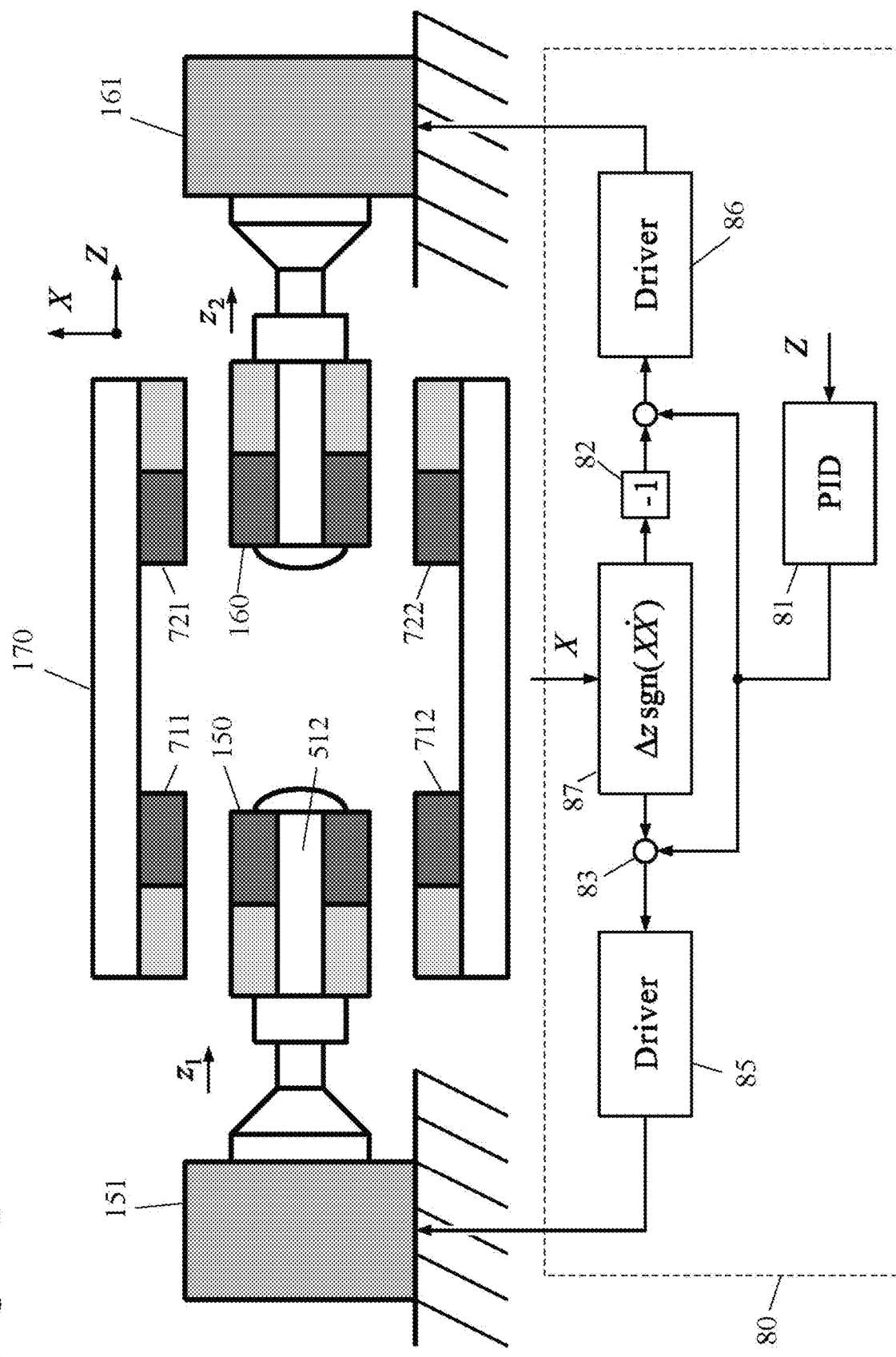
[Fig. 15]

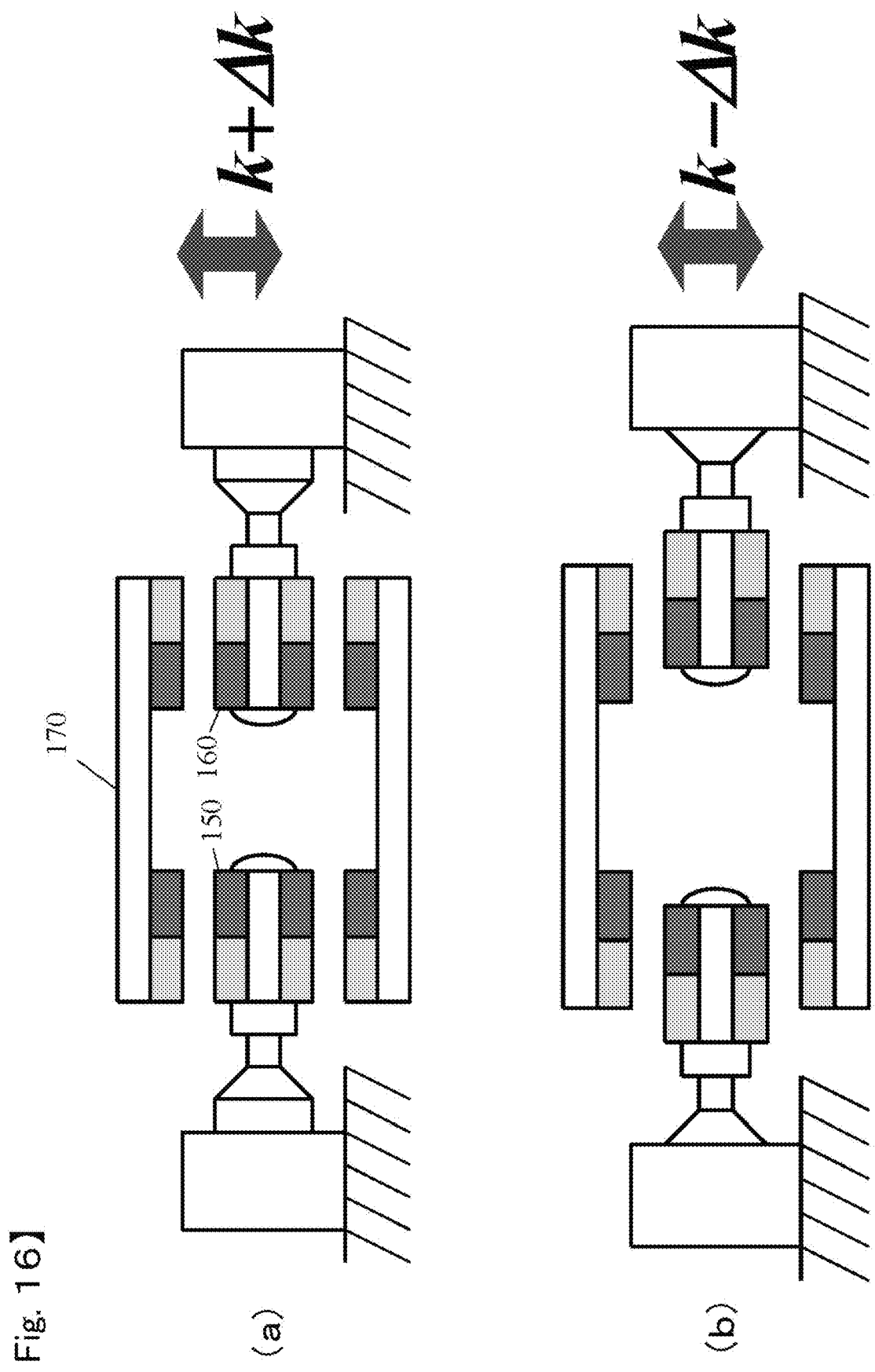

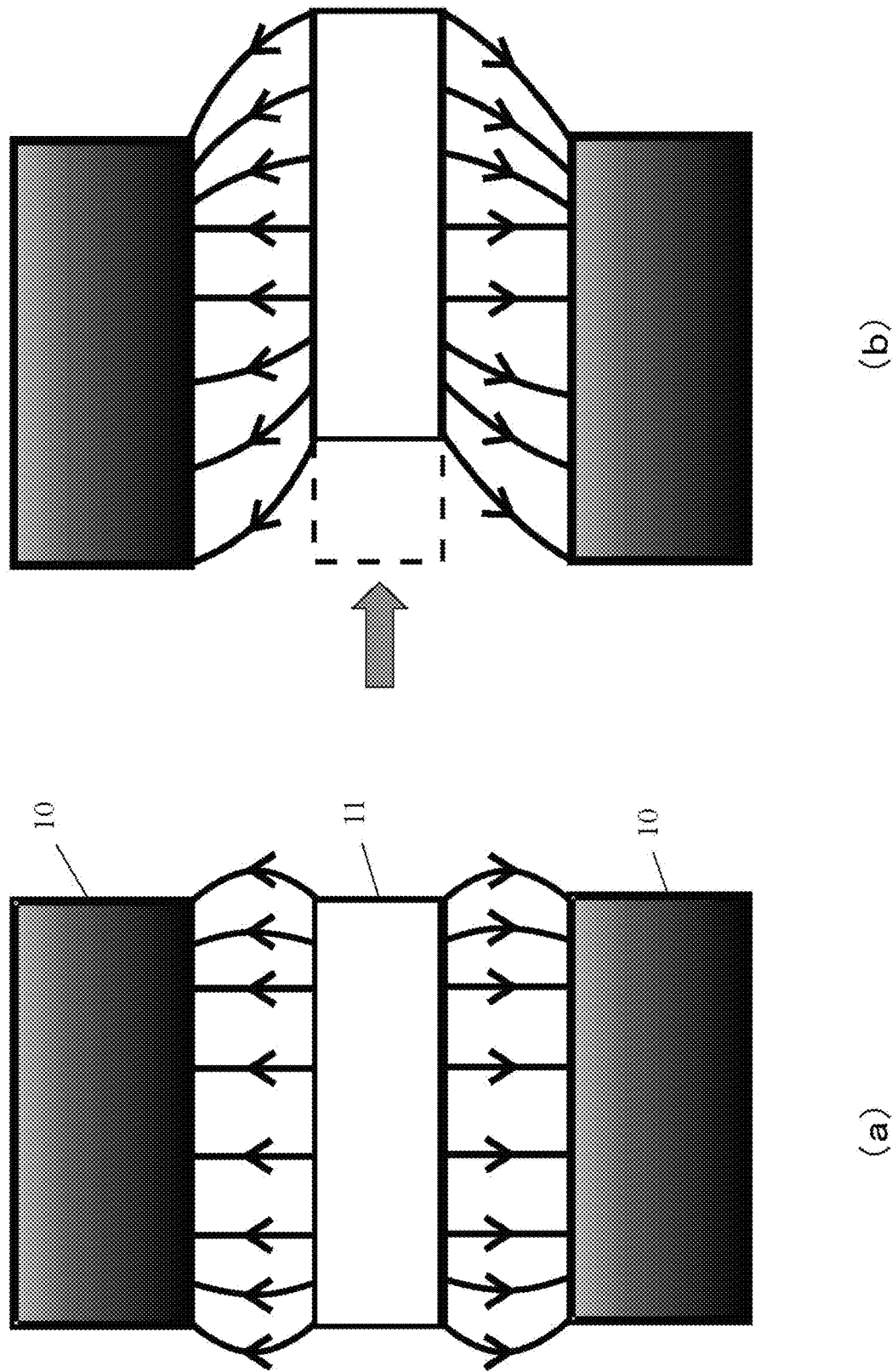

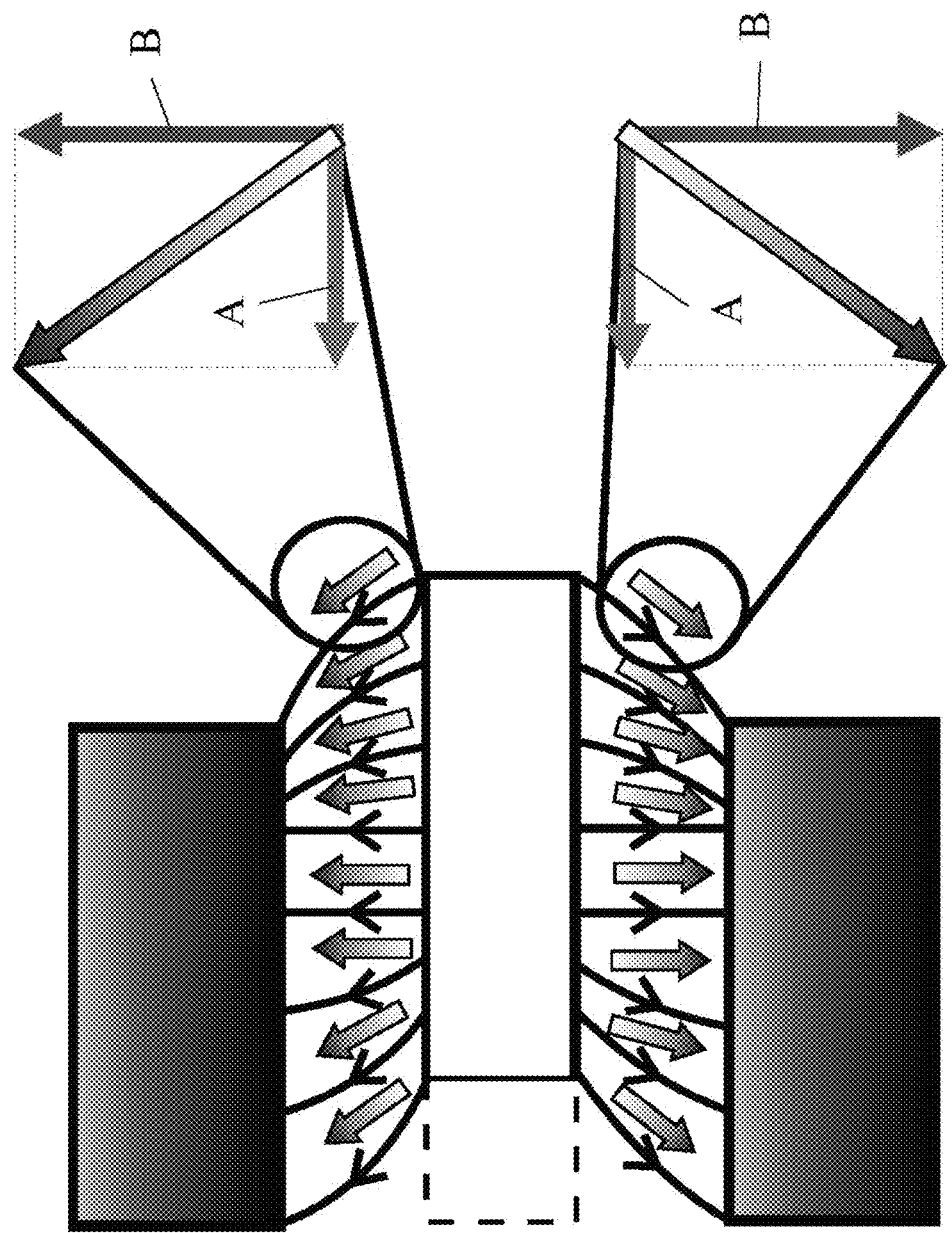
[Fig. 18] (Prior art)

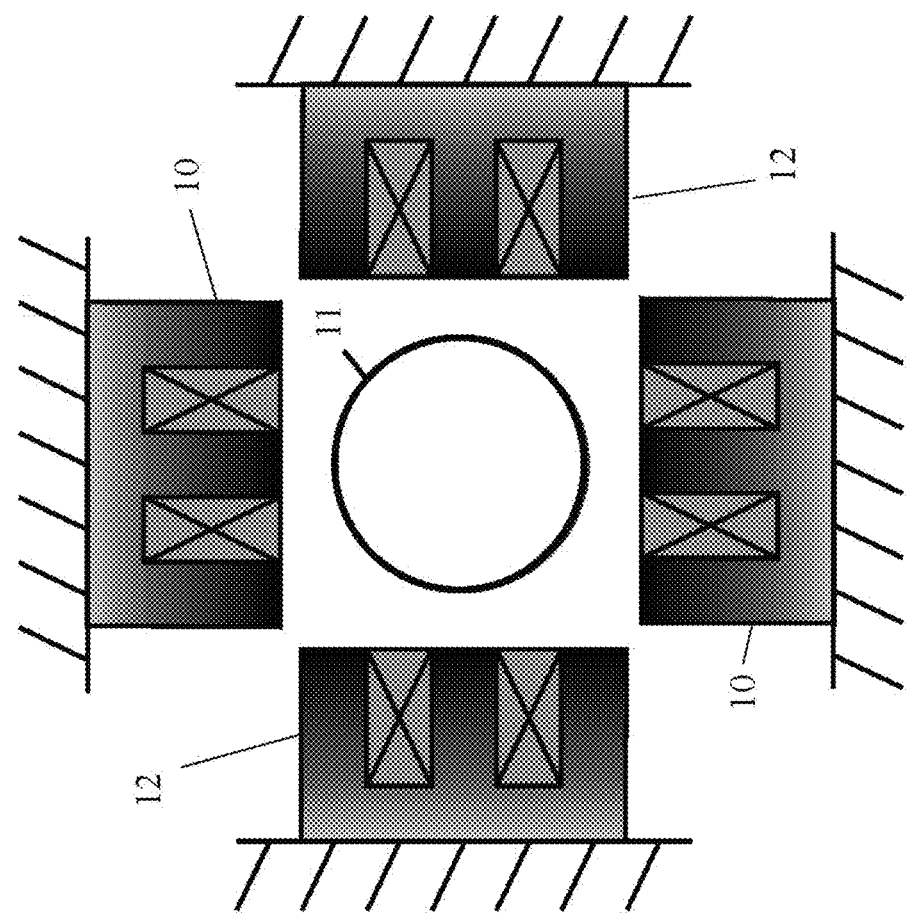
[Fig. 19] (Prior art)

MAGNETIC LEVITATION DEVICE AND METHOD FOR CONTROLLING SAME

TECHNICAL FIELD

The present invention relates to a magnetic levitation device for suspending a levitation object in a non-contact manner utilizing a magnetic force and a method for controlling same, and is realizing a stable and non-contacting suspension of a levitation object at a low cost.

BACKGROUND TECHNOLOGY

A magnetic levitation system enables to suspend an object in a non-contact manner and to use in a special environment such as in vacuum or in a clean room where no evaporation of lubricant is permitted because of low vibration and noise due to mechanical abrasion as well as no need for lubrication.

Magnetic levitation methods include a repulsion type for using a repulsion force of magnets, an attraction type for utilizing an attraction force between a magnet and a ferromagnetic member.

FIG. 17 (a) illustrates how a ferromagnetic member 11 disposed between a pair of electromagnets 10 is suspended in a non-contact manner between the electromagnets by attracting magnetic forces of the upper and lower electromagnets 10. The position of the ferromagnetic member 11 in the vertical direction can be held stably by controlling currents to be supplied to the upper and lower electromagnets 10 that result in adjusting magnetic forces generated by these electromagnets 10.

If any external force is applied to the ferromagnetic member 11 in perpendicular to the direction of disposition of the pair of the electromagnets 10 as illustrated in FIG. 17 (b), the ferromagnetic member 11 suspended in a non-contact manner moves (laterally) in the direction that is pushed. At this instance, as illustrated in FIG. 18, a force including a component of an attracting force B as well as a component of a recovering force A that attempts to recover the lateral movement to the original position act at the edge of the ferromagnetic member 11 extending outwardly from the electromagnets 10. This is known as an "edge effect".

The ferromagnetic member 11 tends to move laterally in the opposite direction to the lateral movement upon receiving the recovering force A, thereby receiving again the recovering force by the edge effect. As a result, the ferromagnetic member 11 repeats vibration in the lateral direction.

As disclosed in the Patent Document 1 below, the vibration in the lateral direction is difficult to converge because no attenuation acts on the ferromagnetic member 11 that is suspended in a non-contact manner.

PRIOR ART DOCUMENT

Patent Document 1: JP 2001-268981 A

SUMMARY OF INVENTION

Problem to be Solved by the Invention

As shown in FIG. 19, such vibration in the lateral direction can be suppressed by disposing a pair of electromagnets 12 at not only upper and lower directions of the ferromagnetic member 11 but also in the front and rear or left and right directions and controlling the current to be supplied to such pairs of electromagnets 12 in the same manner as the upper and lower electromagnets 10, thereby adjusting the magnetic forces generated by the electromagnets 12.

However, such construction tends to increase the number of amplifiers or the like for supplying currents to such electromagnets and thus unavoidably increasing the size and cost of the device.

Taking these matters into consideration, the present invention intends to provide a compact and low cost magnetic levitation device having a vibration damping function in the lateral direction and also to a controlling method for same.

Means to Solve the Problem

The present invention is an electromagnet levitation device for non-contact suspension of a levitation object using an electromagnet force and comprises a pair of magnets for generating magnetic forces for non-contact suspension of the levitation object, a displacement detection means for detecting the displacement of the levitation object in the lateral direction orthogonal to the direction of disposition of the pair of magnets, and a control means for suppressing lateral vibration of the levitation object, wherein the control means controls the pair of magnets so that a stronger magnetic force acts on the levitation object displacing in the direction departing from the center of vibration than the displacement in the direction returning toward the center of vibration.

By enhancing rigidity of the magnetic force when the levitation object moves to depart from the center of vibration and weakening rigidity of the magnetic force when the levitation object returns toward the center of vibration as described hereinabove, such vibration of the levitation object is quickly attenuated.

Also in the magnetic levitation device of the present invention, the pair of magnets comprise magnets disposed in the upper and lower directions and the levitation object includes a ferromagnetic member that is attracted by each of the magnets for supporting between the pair of magnets in a non-contact manner. The control means enhances the current to be supplied to the pair of magnets when the levitation object displaces in the direction departing from the center of vibration and reduces the current to be supplied to the pair of magnets when the levitation object displaces in the direction toward the center of vibration.

In this construction, it is possible to effectively attenuate the vibration in the lateral direction of the attraction type magnetic levitation device.

Also in the magnetic levitation device of the present invention, the control means switches the bias current to be supplied to the pair of electromagnets between an x X x' (written as x·x' hereinafter)≥0 condition and an x·x'<0 condition and the bias current in the x·x'≥0 condition is sets larger than the bias current in the x·x'<0 condition, where x is the displacement of the levitation object vibrating in the lateral direction and x' is a displacement velocity of the levitation object.

In the x coordinate setting the center of lateral vibration to the origin, x·x'≥0 includes two cases when both x and x' are positive and both x and x' are negative and represents the condition when the levitation object displaces in the direction departing from the center of vibration. On the other hand, the x·x'<0 includes the case when x is positive and x' is negative, or the case when x is negative and x' is positive and represents the condition when the levitation object displaces in the direction returning toward the center of vibration. As a result, vibration of the levitation object in the lateral direction can be effectively attenuated by increasing the bias current to be supplied to the pair of electromagnets so as to enhance rigidity of the magnetic force when x·x'≥0, while decreasing the bias current so as to weaken rigidity of the magnetic force when x·x'<0.

Also in the magnetic levitation device of the present invention, it is possible that the control means decreases the bias current to be supplied to the pair of electromagnets in response to the x·x' value when the x·x' value is smaller than a predetermined value.

If the bias current is large when x·x' value is small, it is possible that overrun of the levitation object becomes large and thus increasing the time required for converging the vibration. It is possible to cancel such possibility by decreasing the bias current in response to the x·x' value.

Also in the magnetic levitation device of the present invention, it is possible that the displacement detection means comprises a measurement means disposed in the lateral direction for measuring the distance to the levitation object.

Positive or negative of the x·x' as well as values of the x·x' can be obtained from the change in the distance to the levitation object as detected by the measurement means.

Also, in the magnetic levitation device of the present invention, it is possible that the displacement detection means comprises sensing coils disposed on the electromagnets at the sides opposing to the levitation object for detecting the change in the penetrating magnetic flux.

When the magnetic flux penetrating through the sensing coils tends to decrease, the levitation object displaces in the direction departing from the center of vibration of the levitation object. On the other hand, when the magnetic flux penetrating through the sensing coils tends to increase, the levitation object displaces in the direction returning toward the center of vibration. Condition of the displacement can be detected by the change of the induced electro motive force or the induced current.

Also, in the magnetic levitation device of the present invention, it is possible that the displacement detection means can be implemented by a force sensor for suspending the electromagnets and also for detecting the force acting on the electromagnets.

When the detection value of the force sensor is in a decreasing trend, the displacement is in the direction departing from the center of vibration of the levitation object. On the other hand, when the detection value of the force sensor is in a increasing trend, the displacement is in the direction returning toward the center of vibration of the levitation object.

Also in the magnetic levitation device of the present invention, the levitation object includes a magnet repelling in opposite direction with respect to the pair of magnets, and the levitation object is suspended in a non-contact manner by the repelling force between the pair of magnets and the magnets of the levitation object. The control means moves the pair of magnets to a position to increase a repelling force when the levitation object displaces in the direction departing from the center of vibration, while moving the pair of magnets to a position decreasing the repelling force when the levitation object displaces in the direction returning toward the center of vibration.

This particular construction enables to effectively attenuate the vibration of the repulsion type magnetic levitation device in the lateral direction.

The method for controlling a magnetic levitation device of the present invention suspends in a non-contact manner a levitation object including a ferromagnetic member between a pair of electromagnets disposed in the upper and lower direction and supplies to the pair of electromagnets a current i for suppressing displacement of the levitation object in the direction of disposing the pair of electromagnets superimposed with a bias current $\Delta i$ for suppressing vibration of the levitation object in the lateral direction orthogonal to the disposing direction. And the bias current $\Delta i$ to be supplied to the pair of electromagnets is switched between an x·x'≥0 condition and an x·x'<0 condition and the bias current in the x·x'≥0 condition is made to be larger than the current in the x·x'<0 condition, where x is the displacement of the vibrating levitation object in the lateral direction and x' is the moving velocity of the levitation object.

In this control method, it is possible to stably suspend the levitation object in a non-contact manner using a pair of electromagnets.

In the control method for a magnetic levitation device of the present invention, it is possible to decrease the bias current $\Delta i$ in response to the values of the x·x' when such values of the x·x' are smaller than a predetermined value.

In this arrangement, it is possible to prevent overrun of the levitation object from increasing, thereby reducing the time needed for converging the vibration.

Also, in the method for controlling a magnetic levitation device of the present invention, the bias current $\Delta i$ may be varied in accordance with a function f(x·x') satisfying the following Requirement 1~Requirement 5.

Requirement 1: if x·x'<−$X_0$, f(x·x')=−$\Delta I$
Requirement 2: if −$X_0$<x·x'<0, increase monotonously from −$\Delta I$ to 0.
Requirement 3: f(0)=0
Requirement 4: if 0<x·x'<$X_0$ increase monotonously from 0 to $\Delta I$
Requirement 5: if $X_0$<x·x', f(x·x')=+$\Delta I$ where $X_0$ is a parameter for adjusting a range that the bias current $\Delta i$ varies continuously.

If the bias current $\Delta i$ is varied in accordance with the function f satisfying the above Requirement 1~Requirement 5, since the bias current $\Delta i$ is small as long as the x·x' value is small, it is possible to prevent overrun of the levitation object from becoming large.

Advantage of the Invention

The present invention enables to make compact and low cost magnetic levitation device that stably suspends the levitation object in a non-contact manner.

BRIEF DESCRIPTION OF DRAWINGS

FIG. 1 illustrates an attraction type magnetic levitation device according to a first embodiment of the present invention.

FIG. 2 shows conditions in which x·x' of the levitation object becomes positive or negative.

FIG. 3 shows tracks of x and x' when the levitation object vibrates in the lateral direction.

FIG. 4 illustrates an experiment apparatus.

FIG. 5 shows a disturbance waveform.

FIG. 6 shows lateral vibration waveforms when the bias currents are 0 (a) and 1A (b).

FIG. 7 shows a lateral vibration waveform when the bias current is switch controlled.

FIG. 8 shows changes of x·x' (a) and a switch controlled bias current (b).

FIG. 9 shows a trace of x and x' of a converging lateral vibration.

FIG. 10 shows lateral vibration waveforms when switch controlled with different bias currents.

FIG. 11 shows functions that decrease the bias current within a small range of x·x'.

FIG. 12 shows a lateral vibration waveform when the bias current is controlled in accordance with the function in FIG. 11.

FIG. 13 shows an arrangement when the displacement of the levitation object is detected using sensing coils.

FIG. 14 shows an arrangement when the displacement of the levitation object is detected using a force sensor.

FIG. 15 illustrates a repulsion type magnetic levitation device according to a second embodiment of the present invention.

FIG. 16 shows modes when rigidity of lateral vibration is switched in the device of FIG. 15.

FIG. 17 is explanatory illustrations of the displacement of the levitation object in the attraction type magnetic levitation device.

FIG. 18 illustrates an edge effect of the magnetic levitation device.

FIG. 19 shows a conventional lateral vibration suppression arrangement.

EMBODIMENTS FOR IMPLEMENTING THE INVENTION

First Embodiment

FIG. 1 illustrates an attraction type magnetic levitation device according to a first embodiment of the present invention.

This device comprises a pair of electromagnets 10 disposed in the upper and lower direction (z direction), a ferromagnetic member 11 that is a levitation object suspended in a non-contact manner between the pair of electromagnets, a displacement sensor 20 for detecting the amount of displacement of the ferromagnetic member 11 in the lateral direction (x direction) and a control mechanism 40 for controlling the current to be supplied to the electromagnets 10.

The control mechanism 40 includes a PID control section 41 for generating a bias current in the z direction to cancel the displacement in the z direction by PID control when a displacement signal (z) is inputted from the displacement sensor (not shown) for detecting any displacement of the ferromagnetic member in the z direction, a bias current switching section 47 for switching the bias current in the x direction in response to the product of x and (dx/dt) when a displacement signal (x) is inputted from a displacement sensor 20 that detects any displacement of the ferromagnetic member 11 in the x direction, an inverter 42 for inverting the sign of the bias current in the z direction outputted from the PID control section 41, an adder 43 for adding to the reference current $I_0$ the bias current in the z direction outputted from the PID control section 41 and the bias current in the x direction outputted from the bias current switching section 47, an adder 44 for adding to the reference current $I_0$ the inverted bias current in the z direction outputted from the inverter 42 and the bias current in the x direction outputted from a bias current switching section 47, an amplifier 45 for amplifying the current outputted from the adder 43 before being supplied to the upper electromagnet 10, and an amplifier 46 for amplifying the current outputted from the adder 44 before being supplied to the lower electromagnet 10.

It is to be noted that the control for canceling the displacement in the z direction is well known. The control mechanism 40 features in that the bias current in the x direction is further superimposed with the current I to be supplied to the electromagnet 10 in order to stably hold the levitation object in the z direction. The bias current in the x direction is added equally to both upper and lower electromagnets 10. As a result, there is no possibility of disturbing balance of the ferromagnetic member 11 in the z direction even if the bias current in the x direction is added.

In this specification, (dx/dt) is represented by x'.

A sign function (signum function) sgn(n) from the bias current switching section 47 is equal to 1 if n>0, 0 if n=0 and −1 if n<0. As a result, the bias current switching section 47 outputs ΔI as the bias current in the x direction if x·'>0, while outputs −ΔI as the bias current in the x direction if x·x'<0. It outputs 0 if x·x'=0.

FIG. 2 shows an x·x'>0 zone and an x·x'<0 zone in the Cartesian coordinates consisting of the x and x' axes. The first and third quadrants in the coordinate system are x·x'>0 and represent the condition when the levitation object displaces in the lateral direction departing from the center position (center of vibration) of the electromagnets 10 as illustrated in FIG. 2 (a) and (c). On the other hand, the second and fourth quadrants are x·x'<0 and represent the condition when the levitation object displaces in the lateral direction returning toward the center position (center of vibration) of the electromagnets 10 as illustrated in FIG. 2 (b) and (d).

Assuming the current to be supplied to the electromagnets 10 is $I_0$ in order to keep the balance of the ferromagnetic member 11 in the z direction, a current ($I_0+\Delta I$) is supplied to the electromagnets 10 if x·x'>0, while a current ($I_0-\Delta I$) is supplied to the electromagnets 10 if x·x'<0.

If the current to be supplied to the electromagnets 10 increases, a magnetic force generated by the electromagnets 10 is enhanced, thereby enhancing a recovery force of the ferromagnetic member 11 in the lateral direction and increasing rigidity of the levitation object in the lateral direction.

Assuming the rigidity to the lateral displacement is k+Δk when the current ($I_0+\Delta I$) is supplied to the electromagnets 10, the rigidity decreases to k−Δk when the current ($I_0-\Delta I$) is supplied to the electromagnets 10.

FIG. 3 shows traces of the displacement and velocity on the x-x' Cartesian coordinate system when vibrating in the lateral direction. The traces will change for different rigidity to the lateral displacement. FIG. 3 (a) shows a trace when rigidity to the lateral displacement is high and the trace is elongated in the velocity (x') direction. FIG. 3 (b) shows a trace when rigidity to the lateral displacement is low and the trace is elongated in the displacement (x) direction.

FIG. 3 (c) shows a trace when rigidity to the lateral displacement is switched by the control mechanism in FIG. 1 depending on positive or negative of x·x'. In this case, it follows the trace for low rigidity in the second and fourth quadrants, while it follows the trace for high rigidity in the first and third quadrants for attenuating the vibration.

As apparent from the foregoing, rigidity to the lateral displacement is enhanced in case of x·x'>0, while reducing rigidity to the lateral displacement in case of x·x'<0, thereby quickly converging the vibration in the lateral direction of the levitation object.

Performance of the magnetic levitation device is confirmed through experiments.

FIG. 4 illustrates a plan view of an experiment apparatus. This apparatus comprises electromagnets 51, 52 disposed upper and lower positions of the levitation object 50, a laser displacement meter 54 for detecting displacement of the levitation object 50 in the lateral direction, a torsion spring 55 for restricting the displacement directions of the levitation object 50 only to the lateral direction, and a voice coil motor 53 for causing disturbance in the lateral direction to the levitation object 50.

In this apparatus, since movement of the levitation object 50 is restricted to only translation 1 degree of freedom, or the lateral direction using the torsion spring 55, only bias current to restrict the vibration in the lateral direction is supplied to the electromagnets 51, 52.

FIG. 5 shows disturbance caused by a voice coil motor 53.

FIG. 6 (a) shows for reference vibration of the levitation object 50 in the lateral direction due to disturbance to the levitation object 50 by setting the bias current I equal to 0 in the electromagnets 51, 52. Frequency of the vibration was 3.5 Hz and measurement of the settling time when the amplitude reduces to 5% of the initial value was 64.0 seconds.

On the other hand, FIG. 6 (b) shows for reference the vibration of the levitation object 50 in the lateral direction when disturbance is applied to the levitation object 50 by setting the bias current I equal to 1 A. Frequency of the vibration was 4.3 Hz and the settling time when the amplitude reduces to 5% of the initial value was 59.5 seconds.

Comparison of the frequencies in FIG. 6 (a) and (b) proves that rigidity to the lateral displacement increases 44% by supplying current to the electromagnets 51, 52. However, only enhancing the rigidity is unable to converge the vibration in the lateral direction in a short time.

FIG. 7 shows vibration in the lateral direction of the levitation object 50 when the bias current I in the electromagnets 51, 52 was changed to 1 A if x·x' was positive, while 0 A if x·x' was negative. On the other hand, FIG. 8 shows changes of x·x' (a) as obtained from the measurement of the laser displacement meter 54 and the bias current (b) in the electromagnets 51, 52 when switched in response to either positive or negative of x·x'.

The settling time when the vibration reduces to 5% of the initial value was 2.5 seconds. This is equal to 1/25 of the settling time of vibration as shown in FIG. 6 (a).

FIG. 9 shows a trace of x and x' on the x-x' Cartesian coordinates and is the basis of the x·x' calculation in FIG. 8. It is understood from FIG. 9 that the displacement and velocity converge to 0 in a spiral manner on the coordinates by switching the bias current in the electromagnets 51, 52 to control the rigidity to the lateral displacement.

FIG. 10 shows vibrations in the lateral direction when rigidity control is carried out by changing the magnitude of the bias current to be supplied to the electromagnets 51, 52 while the value of x·x' is positive.

FIG. 10 (a) shows the case when $I_0=\Delta I=0.25$ A, wherein the settling time was 4.9 seconds.

FIG. 10 (b) shows the case when $I_0=\Delta I=0.5$ A, wherein the settling time was 2.4 seconds.

FIG. 10 (c) shows the case when $I_0=\Delta I=0.75$ A, wherein the settling time was 0.9 second.

FIG. 10 (d) shows the case when $I_0=\Delta I=1.0$ A, wherein the settling time was 1.0 second.

It is understood from the foregoing that the settling time can be reduced to a certain extent by increasing the bias current. However, it is to be noted that the settling time is longer in the case $I_0=\Delta I=1.0$ A than in the case $I_0=\Delta I=0.75$ A.

It is assumed that the rigidity changes largely in the case $I_0=\Delta I=0$ A, therefore increasing overrun for a smaller displacement and delaying convergence of the vibration.

This problem can be avoided by decreasing the bias current to be supplied in response to the x·x' value when x·x'>0 and x·x' is smaller than a predetermined value.

FIG. 11 shows the bias current (a) generated by the bias current switching section 47 (FIG. 1) using a sign function sgn and the bias current (b) when generated using arctangent function $(2/\pi)\tan^{-1}(\alpha x \cdot x')$ in place of the sign function sgn. In case of using the arctangent function, the bias current decreases in response to x·x' value in a range when x·x' is small. As a result, chattering is prevented from occurring in a range when x·x' is small. On the other hand, a range to continuously change the bias current is adjusted by the parameter α. The range of continuously changing the bias current is made wider for a smaller α value, while the range of continuously changing the bias current is made narrower for a larger α value. Especially, in an extreme case when α value is infinite, it coincides with the sign function sgn.

FIG. 12 shows vibration in the lateral direction when the bias current I to be supplied to the electromagnets 51, 52 is generated by setting α=80, $I_0=\Delta I=1.0$ A and using the arctangent function $(2/\pi)\tan^{-1}(\alpha x \cdot x')$.

The settling time of the vibration is 0.95 second and is reduced from the settling time of the vibration as shown in FIG. 10 (d).

It is to be noted that the function to replace the sign function sgn is not restricted to the arctangent and it is possible to use any function satisfying the following requirements:

(1) if x·x'<−$X_0$, f(x·x')=−ΔI
(2) if −$X_0$<x·x'<0, increase monotonously from −ΔI to 0.
(3) f(0)=0
(4) if 0<x·x'<$X_0$ increase monotonously from 0 to ΔI
(5) if $X_0$<x·x', f(x·x')=+ΔI It is to be noted herein that $X_0$ is a parameter for adjusting the range of continuously varying the bias current.

Now a description will be made on modified examples of the displacement sensor for detecting the amount of displacement of the levitation object in the lateral direction.

As shown in FIG. 1, there is a certain case where the displacement sensor 20 as disposed in the lateral direction of the levitation object 11 becomes obstacle.

FIG. 13 shows an arrangement of detecting the vibration of the levitation object in the lateral direction by disposing sensing coils 201 at opposing positions of the electromagnets.

The sensing coils 201 generate induction voltage to flow an induction current therein when magnetic flux penetrating such coils changes. In case when the levitation object displaces in the direction departing from the center of vibration, magnetic flux that penetrates the coils decreases, while increasing magnetic flux penetrating the coils when the levitation objects displaces in the direction returning toward the center of vibration. As a result, the polarity of the induced voltage reverses depending on x·x'>0 or x·x'<0, thereby enabling to identify x·x'>0 or x·x'<0 from the direction of the induced current.

Also, FIG. 14 shows an arrangement of supporting the electromagnets by a force sensor 202 for detecting vibration of the levitation object in the lateral direction based on a detection signal from the force sensor 202.

When the levitation object displaces in the direction departing from the center of vibration of the levitation object, the detection signal from the force sensor 202 shows a decreasing trend, while the detection signal from the force sensor 202 shows an increasing trend when displacing in the direction returning toward the center of vibration of the levitation object. As a result, it is possible to identify the x·x'>0 condition or the x·x'<0 condition based on the detection signal from the force sensor 202.

Obviously, it is possible to eliminate the displacement sensor at the side of the magnetic levitation device by employing the arrangement as shown in FIG. 13 and FIG. 14.

Second Embodiment

FIG. 15 illustrates a repulsion type magnetic levitation device according to a second embodiment of the present invention.

This device comprises a pair of permanent magnets 150, 160 disposed in an opposing relationship to each other in the lateral direction (z direction), a magnet holder 151 movable in the z direction while holding the permanent magnet 150, a magnet holder 161 movable in the z direction while holding the permanent magnet 160, permanent magnets 711, 712 repelling the permanent magnet 150, permanent magnets 721, 722 repelling the permanent magnet 160, a levitation object 170 including the permanent magnets 711, 712 and the permanent magnets 721,722 fixedly mounted on the inner wall, and a control mechanism 80 for controlling displacement in the z direction of the magnet holder 151 and the magnet holder 161.

Although the permanent magnet 150 is shown as a single tubular permanent magnet mounted on a shaft 512 of the magnet holder 151, it may comprise a plurality of permanent magnets that are held in symmetrically at upper and lower positions of the shaft 512. It is the same about the permanent magnet 160.

In any event, what is needed is that portions of the permanent magnet 711 and the permanent magnet 712 on the levitation object 170 repel in opposite directions to each other with respect to the permanent magnet 150, similarly portions of 721 and 722 on the levitation object 170 repel in opposite directions to each other with respect to the permanent magnet 160, thereby suspending the levitation object 170 by the permanent magnets 150, 160 in a non-contact manner.

The control mechanism 80 comprises a PID control section 81 for calculating by performing PID control the amount of displacement of the magnet holder 151 and the magnet holder 152 in the z direction for canceling the displacement in the z direction upon receiving a displacement signal (z) from the displacement sensor (not shown), a vibration suppressing displacement switching section 87 for outputting the amount of displacement in the z direction Δz if x·x'>0 or the amount of displacement in the z direction −Δz if x·x'<0 upon receiving the displacement signal (x) from the displacement sensor (not shown) for detecting the displacement in the x direction as a result of vibration of the levitation object 170 in the x direction, an inverter 82 for inverting the sign of the amount of displacement in the z direction outputted from the vibration suppressing displacement switching section 87, an adder 83 for adding the amount of displacement in the z direction outputted from the PID control section 81 and the vibration suppressing displacement switching section 87, an adder 84 for adding the amount of displacement in the z direction outputted from the PID control section 81 and the inverter 82, a driver 85 for displacing the magnet holder 151 in the z direction by the amount of displacement in the z direction outputted from the adder 83, and a driver 86 for displacing the magnet holder 161 by the amount of displacement in the z direction outputted from the adder 84.

When the levitation object 170 in this device tends to displace in the z direction, the magnet holder 151 and the permanent magnet 150 as well as the magnet holder 152 and the permanent magnet 160 displace in the same z direction by the equal distance in such a manner to cancel the displacement of the levitation object 170. By the feedback control, the levitation object 170 is then stably suspended in the z direction in a non-contact manner.

However, since no active control acts in the x direction perpendicular to the direction of disposition of the pair of permanent magnets 150, 160, it is difficult to attenuate the vibration in the x direction (vibration in the lateral direction).

In order to attenuate the vibration in the lateral direction, a z direction displacement amount is outputted from the vibration suppressing displacement switching section 87 and the inverter 82 in response to positive or negative of the x·x'. Since the z direction displacement amount to be outputted from the vibration suppressing displacement switching section 87 and the inverter 82 is to regulate symmetrical displacement of the magnet holder 151 and the magnet holder 152, the pair of permanent magnets 150,160 displace in opposite directions and by an equal distance in the z direction. The symmetrical movement of the permanent magnets 150,160 does not disturb balance of the levitation object 170 in the z direction.

FIG. 16 (a) illustrates a positional relationship between the permanent magnets 150,160 and the levitation object 170 when xx'>0, while FIG. 16 (b) illustrates a positional relationship between the permanent magnets 150,160 and the levitation object 170 when x·x'<0.

In the condition as illustrated in FIG. 16 (a), the permanent magnets 150,160 and the permanent magnets on the levitation object 170 are positively opposed, thereby acting a strong repelling force therebetween. As a result, rigidity to displacement in the x direction (lateral displacement) is high. On the other hand, in the condition as illustrated in FIG. 16 (b), the permanent magnets 150,160 and the permanent magnet on the levitation object 170 are not positively opposed, repelling force therebetween is weak. As a result, rigidity to the lateral displacement is low.

Similarly to the first embodiment, any vibration in the lateral direction is quickly converged by setting the rigidity to strong when x·x'>0, while setting the rigidity to weak when x·x'<0.

INDUSTRIAL APPLICABILITY

The magnetic levitation device of the present invention has advantages to stably suspend the levitation object in a non-contact manner and enables to implement in compact and at a low cost, thereby finding wide applications to various devices using attraction type or repulsion type magnetic levitation systems such as turbo molecular pumps, conveyers to be used in a clean room, gyro-sensors, etc.

DESCRIPTION OF REFERENCE NUMERALS 10 electromagnet
11 ferromagnetic member
12 electromagnet 20 displacement sensor
40 control mechanism
41 PID control section
42 inverter
43 adder
44 adder
45 amplifier
46 amplifier
47 bias current switching section
50 levitation object
51 electromagnet
52 electromagnet
53 voice coil motor
54 laser displacement meter
55 torsion spring
80 control mechanism
81 PID control section
82 inverter
83 adder
84 adder
85 driver
86 driver
87 vibration suppressing displacement switching section
150 permanent magnet
151 magnet holder
160 permanent magnet
161 magnet holder
170 levitation object
201 sensing coil
202 force sensor
711 permanent magnet
712 permanent magnet

The invention claimed is:

1. A magnetic levitation device for suspending a levitation object in a non-contact manner using a magnetic force, comprising:
   a pair of magnets for generating a magnetic force to suspend the levitation object in a non-contact manner;
   a displacement detection means for detecting displacement of the levitation object in the lateral direction perpendicular to the direction of disposition of the pair of magnets; and
   a control means for suppressing vibration of the levitation object in the lateral direction;
   wherein the control means controls the pair of magnets in such a manner that a stronger magnetic force acts on the levitation object when displacing in the direction departing from the center of vibration than when displacing in the direction returning toward the center of vibration, and
   wherein the control means switches a magnitude of the magnetic force acting on the levitation object between $x \cdot x' \geq 0$ condition and $x \cdot x' < 0$ condition, and the magnetic force acting on the levitation object in the $x \cdot x' \geq 0$ condition is set to be larger than the magnetic force acting on the levitation object in the $x \cdot x' < 0$ condition,
   where x is the displacement of the levitation object vibrating in the lateral direction and x' is the velocity of displacement of the levitation object in the lateral direction.

2. The magnetic levitation device of claim 1, wherein the pair of magnets are electromagnets disposed in the upper and lower direction of the levitation object, the levitation object includes a ferromagnetic member suspended between the pair of magnets in a non-contact manner by being attracted by each of the electromagnets, the control means enhances the current to be supplied to the pair of electromagnets when the levitation objects displaces in the direction departing from the center of vibration and weakening the current to be supplied to the pair of electromagnets when the levitation object displaces in the direction returning toward the center of vibration.

3. The magnetic levitation device of claim 2, wherein the control means supplies to the pair of electromagnets a current i for suppressing displacement of the levitation object in the direction of disposing the pair of electromagnets superimposed with a bias current $\Delta i$ for suppressing vibration of the levitation object in the lateral direction orthogonal to the disposing direction, and the bias current $\Delta i$ to be supplied to the pair of electromagnets is switched between an $x \cdot x' \geq 0$ condition and an $x \cdot x' < 0$ condition and the bias current in the $x \cdot x' \geq 0$ condition is made to be larger than the $x \cdot x' < 0$ condition.

4. The magnetic levitation device of claim 3, wherein the control means decreases the bias current $\Delta i$ to be supplied to the pair of electromagnets in response to the $x \cdot x'$ value when such value is smaller than a predetermined value.

5. The magnetic levitation device of claim 1, wherein the displacement detection means is a measurement means disposed in the lateral displacement direction of the levitation object for measuring the distance to the levitation object.

6. The magnetic levitation device of claim 2, wherein the displacement detection means is sensing coils disposed on the electromagnets at opposed sides to the levitation object for detecting any change in the penetrating magnetic flux.

7. The magnetic levitation device of claim 2, wherein the displacement detection means is a force sensor for supporting the electromagnets and detecting any force acting on the electromagnets.

8. The magnetic levitation device of claim 1, the levitation object includes a magnet repelling in the opposite directions with respect to the pair of magnets, and suspending the levitation object by the repelling force between the pair of magnets and the magnet on the levitation object, and the control means displaces the pair of magnets to a location enhancing the repelling force when the levitation object displaces in the direction departing from the center of vibration, while displacing the pair of magnets to a location weakening the repelling force when the levitation object displaces in the direction returning toward the center of vibration.

9. A method for controlling a magnetic levitation device for suspending a levitation object in a non-contact manner using a magnetic force comprising the steps of:
   suspending the levitation object including a ferromagnetic member between a pair of electromagnets disposed in the upper and lower direction; and
   supplying to the pair of electromagnets a current i for suppressing displacement of the levitation object in the direction of disposition of the electromagnets and a bias current $\Delta i$ for suppressing vibration of the levitation object in the lateral direction perpendicular to the direction of disposition superimposing to each other,
   wherein the bias current $\Delta i$ to be supplied to the pair of electromagnets is switched between an $x \cdot x' \geq 0$ condition and an $x \cdot x' < 0$ condition and the bias current in the $x \cdot x' \geq 0$ condition is made larger than the bias current in the $x \cdot x' < 0$ condition, where x is displacement of the levitation object vibrating in the lateral direction and x' is the velocity of displacement of the levitation object in the lateral direction.

10. The method for controlling a magnetic levitation device of claim 9, wherein the bias current Δi is decreased in response to the x·x' value when the x·x' value is smaller than a predetermined value.

11. The method for controlling a magnetic levitation device of claim 10, wherein the bias current Δi is varied in accordance with a function f(x·x') satisfying the following Requirements 1~5:

Requirement 1: if x·x'<-X0, f(x·x')=-ΔI

Requirement 2: if -X0<x·x'<0, increase monotonously from -ΔI to 0

Requirement 3: f(0) -0

Requirement 4: if 0<x·x'<X0, increase monotonously from 0 to ΔI

Requirement 5: X0<x·x', f(x·x')=+ΔI, where X0 is a parameter for adjusting the range for continuously changing the bias current Δi.

\* \* \* \* \*